(12) United States Patent
Yang et al.

(10) Patent No.: US 8,351,542 B2
(45) Date of Patent: Jan. 8, 2013

(54) METHOD AND SYSTEM FOR CREST FACTOR REDUCTION

(75) Inventors: Zigang Yang, Plano, TX (US); Fernando A. Mujica, Allen, TX (US); Gregory Copeland, Plano, TX (US); Murtaza Ali, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 901 days.

(21) Appl. No.: 12/414,000

(22) Filed: Mar. 30, 2009
(Under 37 CFR 1.47)

(65) Prior Publication Data
US 2010/0246714 A1    Sep. 30, 2010

(51) Int. Cl.
*H04L 25/03* (2006.01)

(52) U.S. Cl. .......... 375/296; 375/295; 341/20; 341/173

(58) Field of Classification Search .................. 375/296
See application file for complete search history.

(56) References Cited

U.S. PATENT DOCUMENTS

| | | | |
|---|---|---|---|
| 6,982,593 B2* | 1/2006 | Robinson et al. | 330/10 |
| 7,995,975 B2* | 8/2011 | Sundstrom | 455/116 |
| 8,073,073 B2* | 12/2011 | Navidpour et al. | 375/296 |
| 2004/0052314 A1* | 3/2004 | Copeland | 375/296 |
| 2006/0286946 A1* | 12/2006 | Akkarakaran et al. | 455/101 |
| 2008/0057880 A1* | 3/2008 | Copeland | 455/101 |
| 2008/0101502 A1* | 5/2008 | Navidpour et al. | 375/296 |
| 2008/0247487 A1* | 10/2008 | Cai et al. | 375/296 |
| 2009/0245226 A1* | 10/2009 | Robinson et al. | 370/347 |
| 2011/0268167 A1* | 11/2011 | Sundstrom | 375/224 |
| 2011/0286550 A1* | 11/2011 | Mirbagheri et al. | 375/296 |

OTHER PUBLICATIONS

"Crest Factor Reduction in Multi-Carrier WCDMA Transmitters," IEEE 16th International Symposium on Personal, Indoor and Mobile Radio Communications, Sep. 11-15, 2005, vol. 1, pp. 321-325 (Navid Lashkarian, Helen Tarn and Chris Dick).

"Power Amplifier Linearization With Digital Pre-Distortion and Crest Factor Reduction," 2004 IEEE MTT-S Int. Microwave Symposium Digest, vol. 2, pp. 669-672 (Roland Sperlich, Youngcheol Park, Greg Copeland and J. Stevenson Kenney).

\* cited by examiner

*Primary Examiner* — David Ometz
*Assistant Examiner* — Santiago Garcia
(74) *Attorney, Agent, or Firm* — John J. Patti; Wade J. Brady, III; Frederick J. Telecky, Jr.

(57) ABSTRACT

An apparatus and system are provided for crest factor reduction (CFR). Preferably, a peak from the wideband signal is detected. A gain from the magnitude of the peak and a threshold can then be calculated. Based on this information, each carrier's contribution to the peak can be approximated, and a cancellation pulse coefficient for each carrier from its contribution to the peak can be calculated. A base cancellation pulse can be calculated from the cancellation pulse coefficients for each carrier, and a cancellation pulse can be calculated from the base cancellation pulse and the gain, which can then be applied to the wideband signal.

11 Claims, 6 Drawing Sheets

METHOD AND SYSTEM FOR CREST FACTOR REDUCTION

TECHNICAL FIELD

The invention relates generally to crest factor reduction (CFR) and, more particularly, to CFR in a multi-carrier system.

BACKGROUND

In a radio frequency (RF) system, the efficiency of a power amplifier can be an important aspect of the function of the system. To assist in improving the efficiency of a power amplifier in an RF system, the baseband signal can be clipped to reduce the peak-to-average ratio (PAR) before modulation to the RF band. The process of clipping the baseband is generally referred to as crest factor reduction (CFR). A simple clipping algorithm can be sufficient for some applications, but it does generate a noise floor across the frequency.

In some applications, such as wideband code division multiple access (WCDMA), a higher adjacent channel leakage ratio (ALCR) compared to the in-band signal noise floor is employed. For example, a WCDMA system usually requires 65 dB ALCR and −25 dB error vector magnitude (EVM). One way to achieve this is through the use of a cancellation pulse (CP) algorithm that can accurately achieve the desired PAR and ALCR requirements.

Figure 1A:
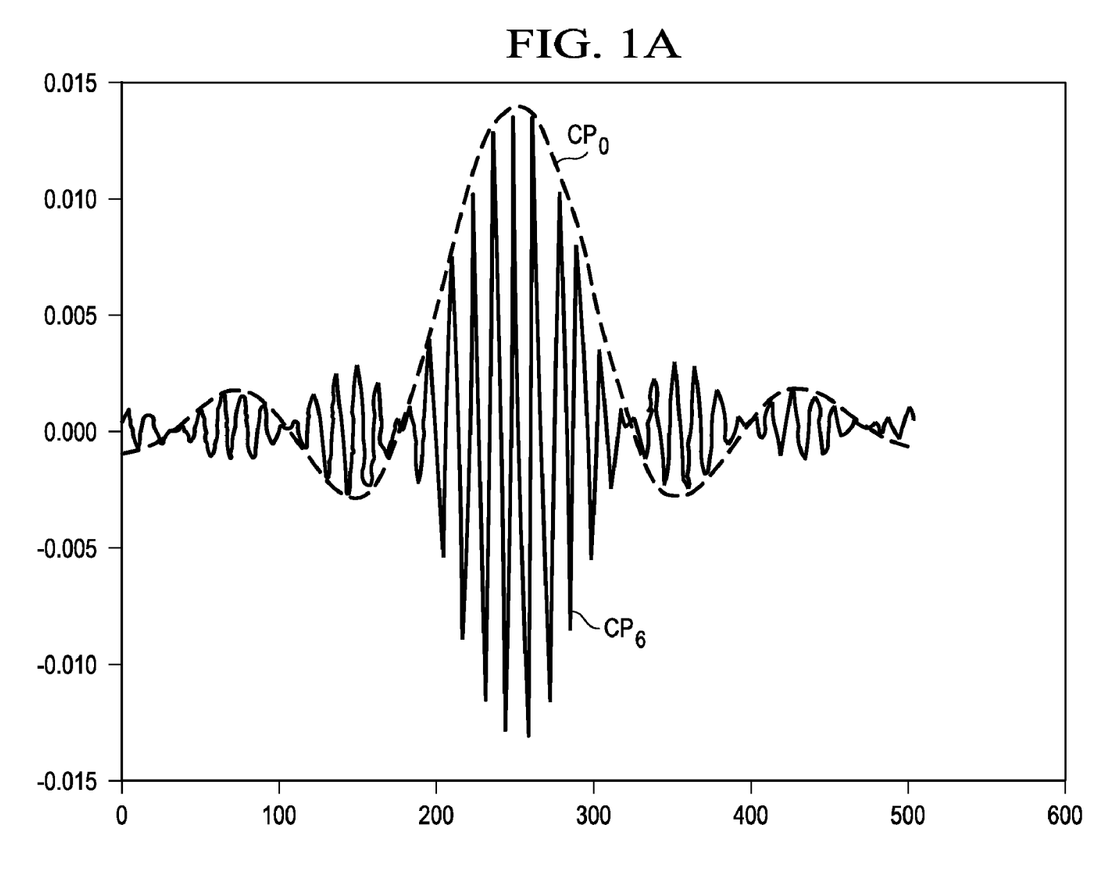
FIG. 1A is a graph depicting an example of a cancellation pulse.
Figure 1B:
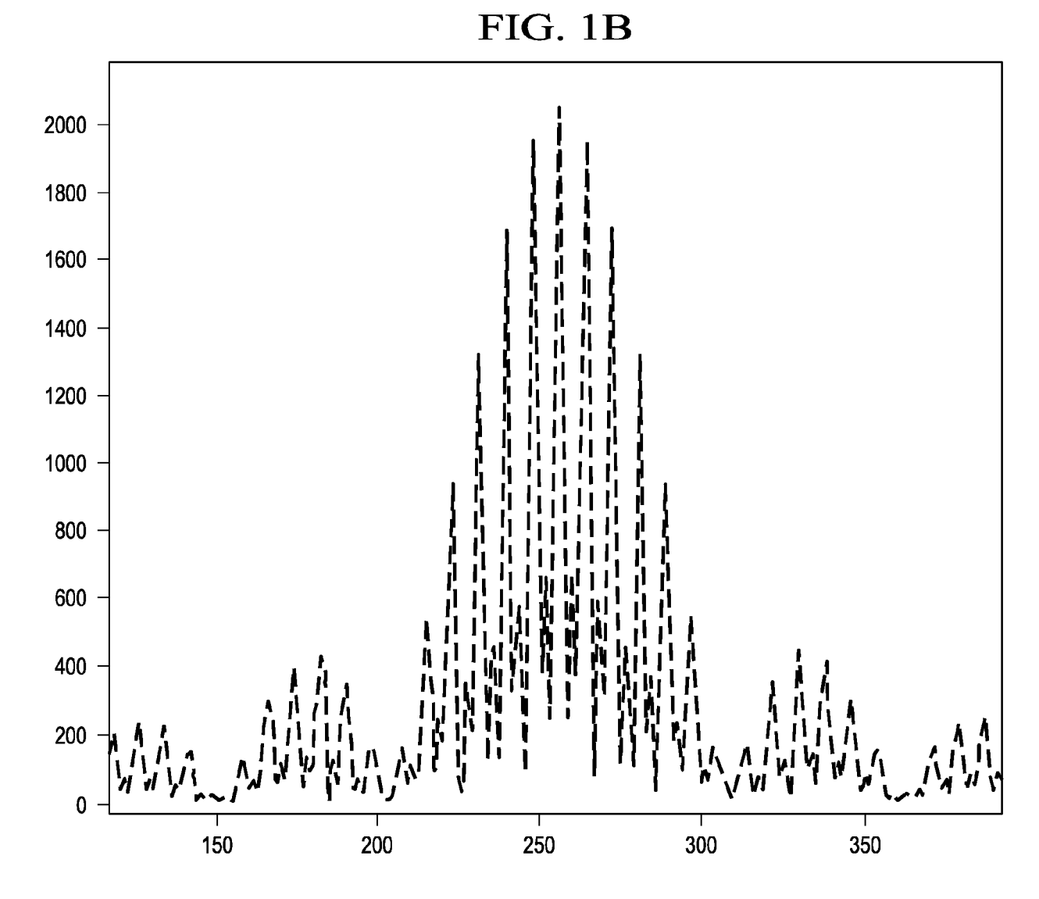
FIG. 1B is graph depicting an example "superpeak"

For CP-based systems, though, "superpeak" situations can occur. In a multi-carrier narrowband signal, a closely spaced group of signals can appear as a "superpeak." Looking to FIG. 1A as an example, a base CP with a bandwidth of 1.25 MHz and a sampling frequency of 61.44 MHz is shown, where $CP_0$ denotes the CP with a center frequency at 0 and $CP_6$ denotes the CP with a center frequency at 7.5 MHz. Thus, as can be seen in FIG. 1B, a "superpeak" that receives contributions from $CP_0$ and $CP_6$ can be seen.

Figure 1C:
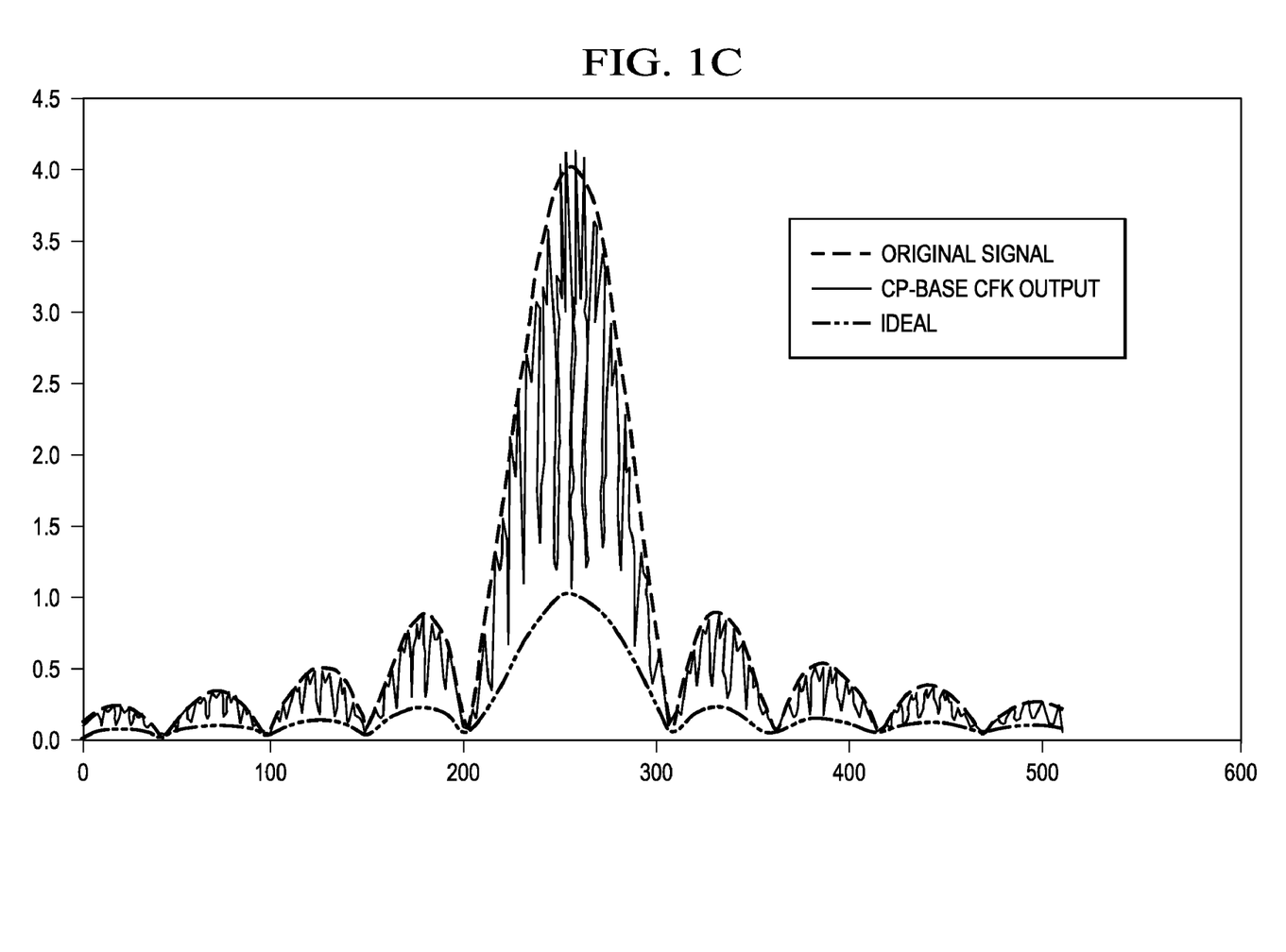
FIG. 1C is a graph depicting an example "peak re-growth"

These "superpeaks" can further result in "peak re-growth," where peaks re-grow even after a cancellation algorithm is applied. The new peaks resulting from the re-growth can be larger in amplitude than the original peak. A peak re-growth condition is illustrated in FIG. 1C. Assuming that there are three carriers at −7.5 MHz, 0 Hz, and 7.5 MHz and that the peak is only contributed by the third carrier (7.5 MHz), the output of CP-based CFR includes peaks that are above the threshold.

Some examples of prior art systems are: Lashkarian et al., "Crest Factor Reduction in Multi-Carrier WCDMA Transmitters," 2005 *IEEE 16th International Symposium on Personal, Indoor, and Mobile Communications*, Vol. 1, pp. 321-325, Sep. 11-15, 2005; U.S. Patent Pre-Grant Publication No. 2004/0052314; and Sperlich et al., "Power Amplifier Linearization with Digital Predistortion, and Crest Factor Reduction," *IEEE MTT-S Int. Microwave Symposium Dig.*, Vol. 2, pp. 669-672, 2004.

SUMMARY

A preferred embodiment of the present invention, accordingly, an apparatus. The apparatus comprises an input section that receives an input signal and that generates an intermediate signal, wherein the input section includes: an interface that receives the input signal and that generates a wideband signal; a crest factor reduction (CFR) unit that reduces a peak-to-average ratio (PAR) of the wideband signal, wherein the CFR unit has a stage that includes: a peak detector that detects a peak from the wideband signal; and a cancellation pulse calculator that is coupled to the peak detector and that calculates a cancellation pulse having an envelop and phase information that are approximately the same as the peak; output logic that receives a signal the wideband signal from the CFR unit having a reduced PAR and that generates the intermediate signal; and an output section that receives the intermediate signal and that generates a transmission signal.

In accordance with a preferred embodiment of the present invention, the cancellation pulse calculator further comprises a gain calculator that is coupled to the peak detector and that calculates a gain from the magnitude of the peak and a threshold; a contribution calculator that is coupled to the peak detector and that approximates each carrier's contribution to the peak; a coefficient calculator that is coupled to the contribution calculator and that calculates a cancellation pulse coefficient for each carrier from its contribution to the peak; a first pulse calculator that is coupled to the coefficient calculator and that calculates a base cancellation pulse from the cancellation pulse coefficients for each carrier; a second pulse calculator that is coupled to the gain calculator and to the first pulse calculator and that calculate a cancellation pulse from the base cancellation pulse and the gain; and a peak canceller that is coupled to the peak detector and to the second pulse calculator and that applies the cancellation pulse to the wideband signal.

In accordance with a preferred embodiment of the present invention, the interface further comprises interface logic that receives the input signal; and a digital upconverter (DUC) that receives an output from the interface logic and that generates the wideband signal.

In accordance with a preferred embodiment of the present invention, the CFR unit further comprises a plurality of stages that each have the computer program produce embodied thereon.

In accordance with a preferred embodiment of the present invention, the output section further comprises an analog-to-digital converter (ADC) pipeline that receives a feedback signal; and a digital-to-analog converter (DAC) pipeline that generates the transmission signal from an output from the ADC pipeline and the intermediate signal.

In accordance with a preferred embodiment of the present invention, the cancellation pulse calculator further comprises a lookup table that includes a plurality of prestored cancellation pulses.

In accordance with a preferred embodiment of the present invention, a system for generating and transmitting a transmission signal is provided. The system comprises an input section that receives an input signal and that generates an intermediate signal, wherein the input section includes an interface that receives the input signal and that generates a wideband signal; a crest factor reduction (CFR) unit that that reduces a peak-to-average ratio (PAR) of the wideband signal, wherein the CFR unit has a stage that includes: a peak detector that detects a peak from the wideband signal; and a cancellation pulse calculator that is coupled to the peak detector and that calculates a cancellation pulse having an envelop and phase information that are approximately the same as the peak; output logic that receives a signal the wideband signal from the CFR unit having a reduced PAR and that generates the intermediate signal; an output section that receives the intermediate signal and that generates a digital transmission signal; transmission circuitry that receives the digital transmission signal and generates a radio frequency (RF) signal; and an antenna that outputs the RF signal.

In accordance with a preferred embodiment of the present invention, the cancellation pulse calculator further comprises a gain calculator that is coupled to the peak detector and that that calculates a gain from the magnitude of the peak and a threshold; a contribution calculator that is coupled to the peak detector and that approximates each carrier's contribution to the peak; a coefficient calculator that is coupled to the contribution calculator and that calculates a cancellation pulse coefficient for each carrier from its contribution to the peak; a first pulse calculator that is coupled to the coefficient calculator and that calculates a base cancellation pulse from the cancellation pulse coefficients for each carrier; a second pulse calculator that is coupled to the gain calculator and to the first pulse calculator and that calculate a cancellation pulse from the base cancellation pulse and the gain; and a peak canceller that is coupled to the peak detector and to the second pulse calculator and that applies the cancellation pulse to the wideband signal.

In accordance with a preferred embodiment of the present invention, the interface further comprises: interface logic that receives the input signal; and a DUC that receives an output from the interface logic and that generates the wideband signal.

In accordance with a preferred embodiment of the present invention, the CFR unit further comprises a plurality of stages that each have the computer program produce embodied thereon.

In accordance with a preferred embodiment of the present invention, the output section further comprises: an analog-to-digital converter (ADC) pipeline that receives a feedback signal; and a digital-to-analog converter (DAC) pipeline that generates the transmission signal from an output from the ADC pipeline and the intermediate signal.

In accordance with a preferred embodiment of the present invention, the cancellation pulse calculator further comprises a lookup table that includes a plurality of prestored cancellation .pulses.

In accordance with a preferred embodiment of the present invention, the computer code for approximating each carrier's contribution to the peak further comprises computer code for correlating the wideband signal around a location of the peak with a central portion of each carrier's base cancellation pulse.

In accordance with a preferred embodiment of the present invention, the transmission circuitry further comprises: a digital-to-analog converter (DAC) that receives the digital transmission signal; a quadrature modulator that receives an output from the DAC and generates the RF signal; an amplifier that amplifies the RF signal; and an analog-to-digital converter (ADC) feedback pipelines that generates a feedback signal for the output section from the RF signal.

In accordance with a preferred embodiment of the present invention, a computer program product for reducing a PAR of a wideband signal in a transmission processor is provided. The computer program product comprises computer code for detecting a peak from the wideband signal; computer code for calculating a gain from the magnitude of the peak and a threshold; computer code for approximating each carrier's contribution to the peak; computer code for calculating a cancellation pulse coefficient for each carrier from its contribution to the peak; computer code for calculating a base cancellation pulse from the cancellation pulse coefficients for each carrier; computer code for calculating a cancellation pulse from the base cancellation pulse and the gain; and computer code for applying the cancellation pulse to the wideband signal.

In accordance with a preferred embodiment of the present invention, the computer code for calculating a cancellation pulse from the base cancellation pulse and the gain further comprises computer code for selecting a pre-stored cancellation pulse from a lookup table having an envelop and phase information that are approximately the same as the peak.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Refer now to the drawings wherein depicted elements are, for the sake of clarity, not necessarily shown to scale and wherein like or similar elements are designated by the same reference numeral through the several views.

Figure 2:
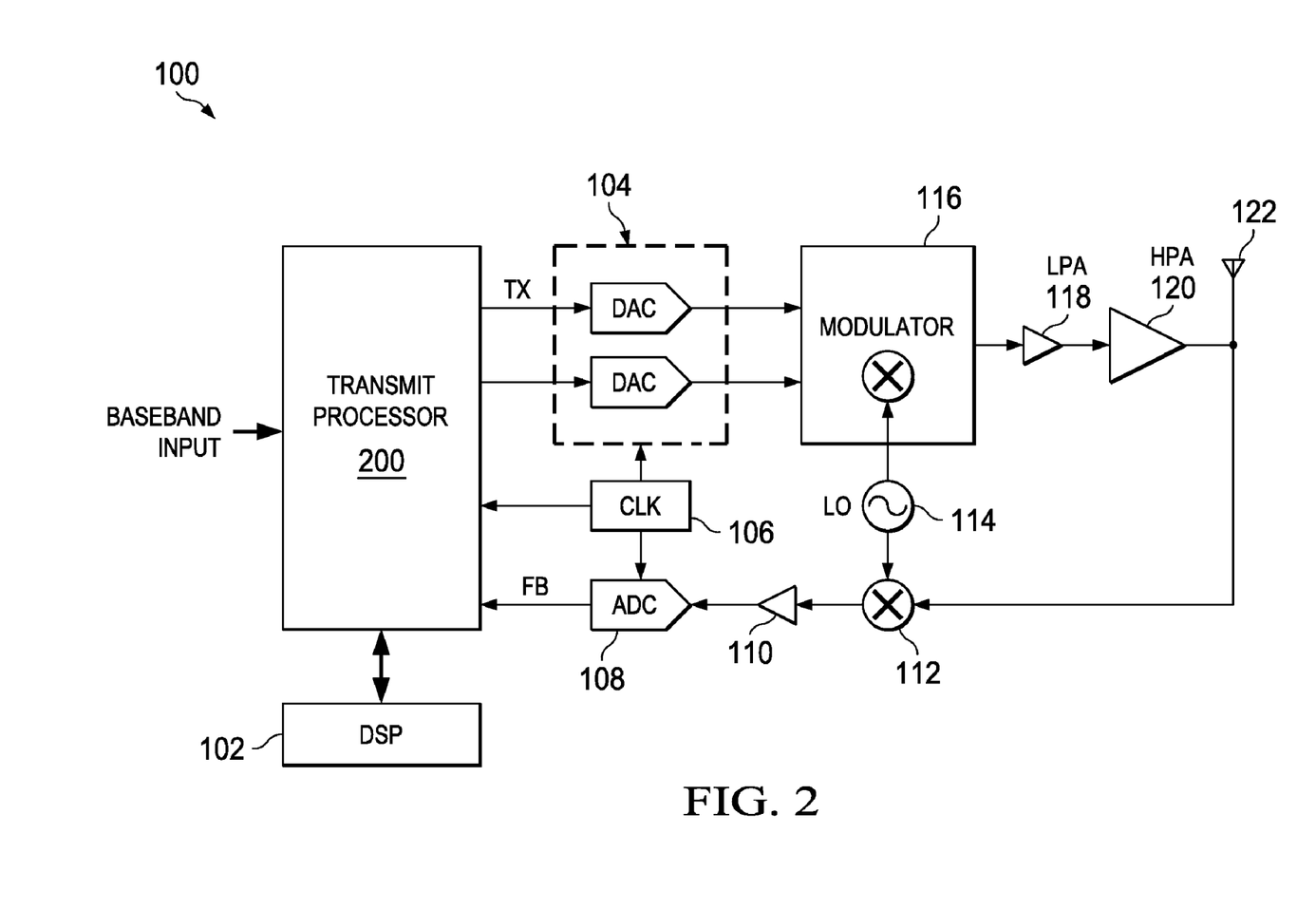
FIG. 2 is a block diagram of a system for transmitting a signal in accordance with a preferred embodiment of the present invention.

Referring to FIG. 2 of the drawings, the reference numeral 100 generally designates a system for transmitting a signal in accordance with a preferred embodiment of the present invention. The system 100 is generally comprised of a digital signals processor 102, a transmit processor 200, a digital-to-analog converter (DAC) 104, a clock generator 106, an analog-to-digital converter (ADC) 108, a amplifier 110, a mixer 112, a phase locked loop (PLL) 114, a modulator 116, a low power amplifier (LPA) 118, a high power amplifier (HPA) 120, a radiator 122, and a feedback pipeline (generally mixer 112, amplifier 110, and ADC 108). Typically, the system 100 is employed in a cellular or other wireless communication network, preferably within a base transceiver station (BTS).

In operation, the system 100 receives a baseband input and outputs a radio frequency (RF) signal through the radiator 122 (which is preferably an antenna). Preferably, the transmit processor 200 operates as a predistortion transmit processor that utilizes the DSP 102 and clock 106 to convert an baseband input signal into a transmission signal TX. The transmission signal TX is preferably in a quadrature or I/Q format that is typically employed in third generation (3G) code division multiple access (CDMA) and orthogonal frequency division multiple access (OFDMA) applications.

Figure 3:
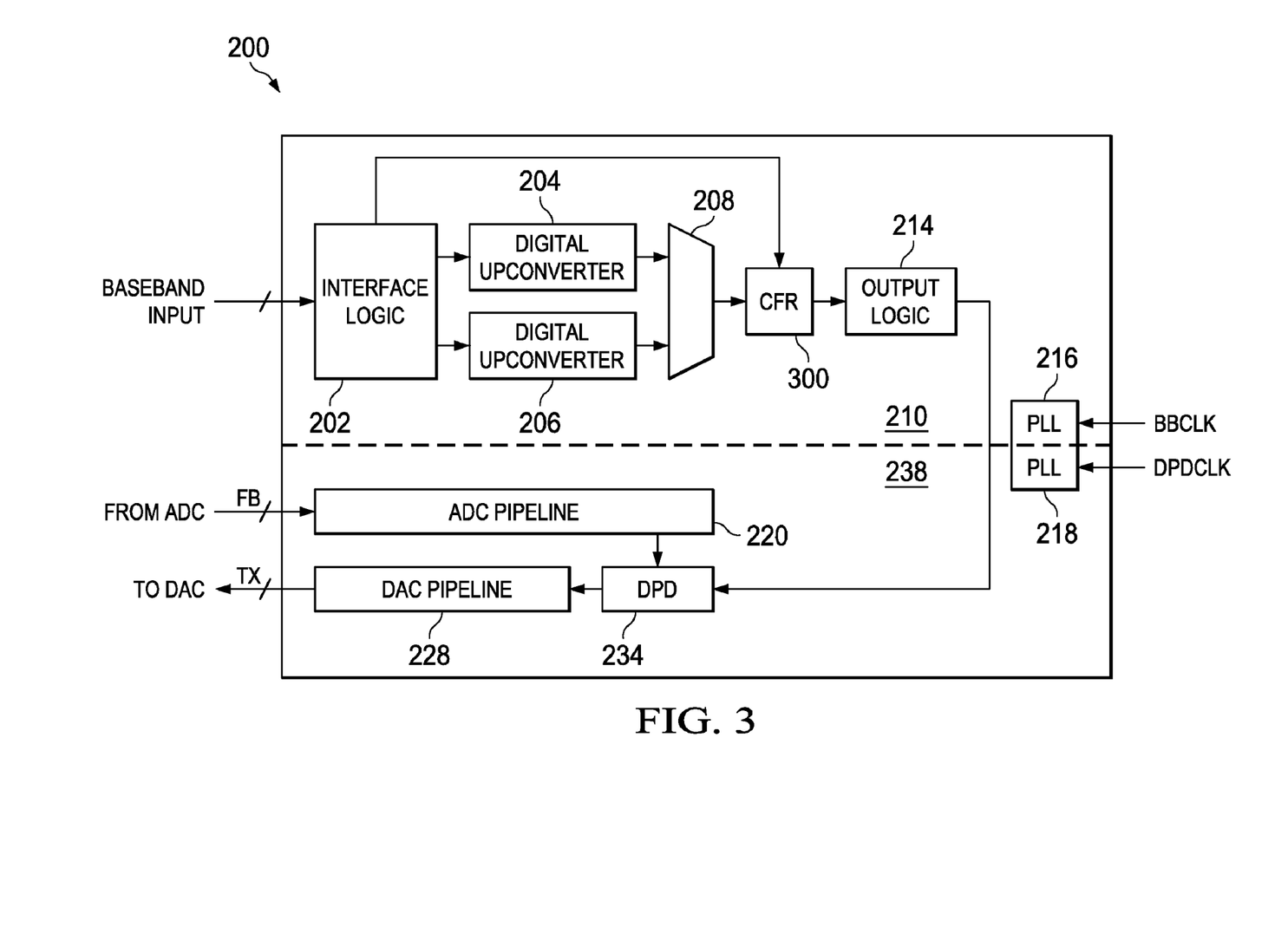
FIG. 3 is a block diagram of a transmit processor of FIG. 2.

Turning to FIG. 3 of the drawings, processor 200 can be seen in greater details. Preferably, processor 200 is comprised of two stages: an input or baseband stage 210 and an output or digital predistortion (DPD) stage 238.

The input stage 202 receives the baseband input signal and operates in a first or baseband time domain. Preferably, stage 202 utilizes a PLL 216, which receives a baseband clock signal BBCLK from clock 106, for timing in this first time domain. In operation, an interface (which is generally comprised of interface logic 202, digital upconverters 204 and 206, and multiplexer 208) upconverts, spectrally shapes, and combines multiple channels into a multiplexed wideband channel in a quadrature format. The output of the interface is processed by the CFR unit 300 to reduce the peak-to-average ratio (PAR). The output logic 214 further process the output from the CFR for the buffers 236 of the output stage 238.

The output stage 238 can then generate a transmission signal TX from the feedback signal FB from the feedback pipeline and the output of the output logic 214. Preferably, the output stage 238 operates on a second or DPD time domain by employing PLL 218, which generally receives a DPD clock signal DPDCLK from the clock 106. The output stage 238 is generally comprised of a DAC stage (which is generally comprised of DPD unit 234 and a DAC pipeline 228) that generates the transmission signal and an ADC pipeline 220 that generates a correction signal from the feedback signal FB.

Figure 4:
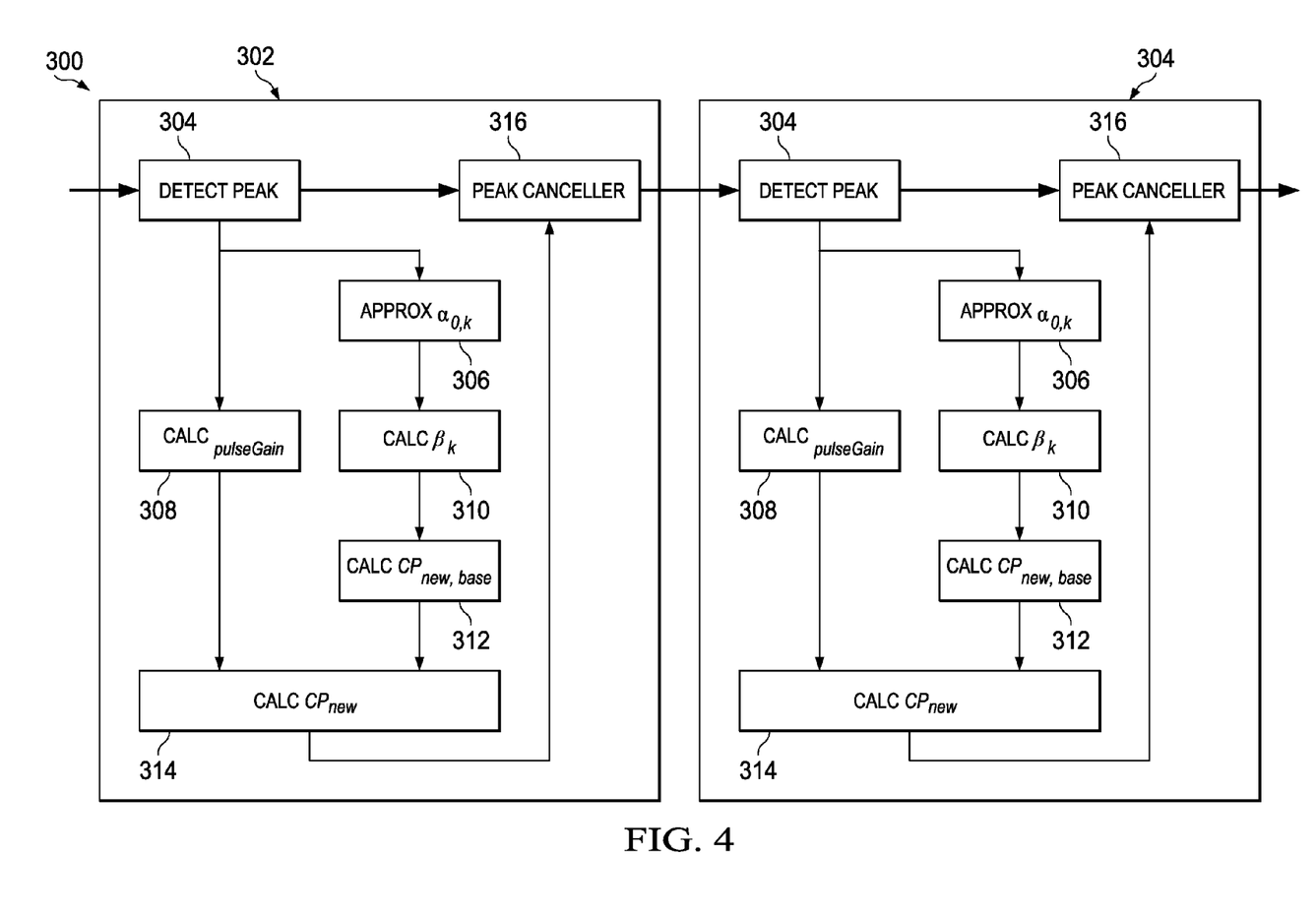
FIG. 4 is a block diagram of crest factor reduction (CFR) of FIG. 3.

Referring to FIG. 4 of the drawings, the CFR unit 300 is shown in greater detail. Preferably, the CFR unit 300 has a plurality of stages. Here, an example is shown with a two stages 302 and 304. Each stage 302 and 304 generally follows the same process or algorithm, and the CFR unit 300 is preferably implemented in hardware. Alternatively, the algorithm of stages 302 and 304 can be implemented by a processor with a computer program embodied thereon. To process these signals, a multi-carrier narrowband signal can be represented as follows:

$$S(t) = \sum_k s_k(t) = \sum_k \sum_j a_{j,k} f_k(t - jT_b) = \sum_k \sum_j a_{j,k} f_0(t - jT_b)\exp[i\omega_k t], \quad (1)$$

where the bandwidth has a center frequency at $\omega_k$, $a_{i,k}$ is the complex sample value, $f_0(t)$ is the base-band sampling filter, and $T_b$ is the sampling period. Additionally, if the sampling rate $f_S$ is much than $1/T_b$ ($f_S \gg 1/T_b$), then each carrier $s_k(t)$ can be represented as follows:

$$s_k(t) = s_k(nT_S) = \sum_j a_{j,k} f_0(nT_S - jT_b)\exp[i\omega_k nT_S], \quad (2)$$

where $T_S$ ($1/f_S$) is the sampling period. Now, replacing the continuous sampling filter $f_0(t)$ with a discrete time sequence the multi-carrier narrowband signal S(t) can be represented as follows:

$$S(n) = S(nT_S) = \sum_k \sum_j a_{j,k} CP_k\left(n - j\frac{T_b}{T_S}\right), \quad (3)$$

where $CP_k(t)$ is the base cancellation pulse for carrier k. This base cancellation pulse $CP_k(t)$ is orthogonal under the following conditions:

$$\sum_{n=-N}^{N} CP_j(n)CP_k^*(n) = 0, \forall j \neq k, \quad (4)$$

and is nearly orthogonal under the following conditions:

$$\sum_{n=-N}^{N} CP_k\left(n - i\frac{T_b}{T_S}\right)CP_k^*\left(n - j\frac{T_b}{T_S}\right) \ll \sum_{n=-N}^{N} \left|CP_k\left(n - i\frac{T_b}{T_S}\right)\right|^2, \forall i \neq j, \quad (5)$$

Bearing this in mind, the peak cancellation can be accomplished. In step 304, a peak is detected at a location $N_{peakloc}$. With this location $N_{peakloc}$, the contributions from each carrier $a_{j,k}$ to the peak can be calculated. Preferably, the contributions from each carrier $a_{j,k}$ can be approximated by correlating the signal with the conjugate of each base cancellation pulse as follows:

$$S(n) = S(nT_S) = \sum_k \sum_i a_{i,k} CP_k\left(n - i\frac{T_b}{T_S}\right) \quad (6)$$

$$\Updownarrow$$

$$\sum_{n=-N}^{N} S(n)CP_m^*\left(n - j\frac{T_b}{T_S}\right) = \sum_k \sum_i \sum_{n=-N}^{N} a_{i,k} CP_k\left(n - i\frac{T_b}{T_S}\right)CP_m^*\left(n - j\frac{T_b}{T_S}\right).$$

Since the cancellation $CP_k(t)$ is orthogonal under equation (4) above, equation (6) can be reduced as follows:

$$\sum_{n=-N}^{N} S(n)CP_m^*\left(n - j\frac{T_b}{T_S}\right) = \sum_i \sum_{n=-N}^{N} a_{i,m} CP_m\left(n - i\frac{T_b}{T_S}\right)CP_m^*\left(n - j\frac{T_b}{T_S}\right). \quad (7)$$

Additionally, because the cancellation $CP_k(t)$ is nearly orthogonal under conditions of equation (5) above, equation (7) can be reduced as follows:

$$\sum_{n=-N}^{N} S(n)CP_m^*\left(n - j\frac{T_b}{T_S}\right) = a_{j,m} \sum_{n=-N}^{N} CP_m\left(n - j\frac{T_b}{T_S}\right)CP_m^*\left(n - j\frac{T_b}{T_S}\right). \quad (8)$$

Thus, the contribution for each carrier is:

$$a_{j,m} \approx \frac{\sum_{n=-N}^{N} S(n)CP_m^*\left(n - j\frac{T_b}{T_S}\right)}{\sum_{n=-N}^{N} CP_m\left(n - j\frac{T_b}{T_S}\right)CP_m^*\left(n - j\frac{T_b}{T_S}\right)} = \frac{1}{E}\sum_{n=-N}^{N} S(n)CP_m^*\left(n - j\frac{T_b}{T_S}\right), \quad (9)$$

where E is the power of base cancellation pulse. In particular, the contribution $a_{0,k}$ can be approximated as follows:

$$a_{0,k} \approx \frac{\sum_{n=-(C-1)/2}^{(C-1)/2} S(n)CP_k^*(n)}{\sum_{n=-(C-1)/2}^{(C-1)/2} CP_k(n)CP_k^*(n)} = \frac{1}{E}\sum_{n=-N}^{N} S(n)CP_k^*(n) \forall 1 \leq k \leq K, \quad (10)$$

where C is the correlation length and K is the total number of carriers. Typically, the correlation length is equal to the length of CP. But can be cut to about 1/10 the length of CP to reduce the computational complexity. In step 306 for location $N_{peakloc}$, the approximated contribution would be:

$$a_{0,k} \approx \frac{\sum_{n=-(C-1)/2}^{(C-1)/2} S(N_{peakloc})CP_k^*(n)}{\sum_{n=-(C-1)/2}^{(C-1)/2} CP_k(n)CP_k^*(n)} = \quad (11)$$

$$\frac{1}{E} \sum_{n=-N}^{N} S(N_{peakloc})CP_k^*(n) \forall \ 1 \le k \le K,$$

Also, once the location $N_{peakloc}$ has been determined, the gain or pulseGain can be calculated in step 308. The pulseGain is, preferably, the difference between the peak $S(N_{peakloc})$ and a threshold R with the phase of peak $S(N_{peakloc})$ preserved. Thus, the pulseGain is preferably:

$$pulseGain = \left(\frac{R}{|S(N_{peakloc})|} - 1\right) S(N_{peakloc}). \quad (12)$$

In step 310, the cancellation pulse coefficients $\beta_k$ are calculated. Assuming signal samples around peak location can be approximated as follows:

$$S(n + N_{peakloc}) = \quad (13)$$
$$\sum_k \sum_j a_{j,k} CP_k\left(n - j\frac{T_b}{T_s}\right) \approx CP_0(n) \sum_k a_{0,k} \exp\left[i 2\pi n \frac{f_k}{f_s}\right],$$

it less than or equal to an upper bound envelope (UBE) of:

$$UBE = CP_0(n) \sum_k |a_{0,k}|. \quad (14)$$

Additionally, the peak sample $S(N_{peakloc})$ is:

$$S(N_{peakloc}) \approx CP_0(n) \sum_k a_{0,k}. \quad (15)$$

A new cancellation pulse $cp_{new}$ can be can then be constructed to have the following form:

$$cp_{new} = \sum_k \Delta a_{0,k} CP_0(n). \quad (16)$$

After applying the new cancellation pulse $cp_{new}$ the new peak sample is:

$$\hat{S}(N_{peakloc}) = CP_0(n) \sum_k a_{0,k} + \Delta a_{0,k}, \quad (17)$$

with an upper bound envelope (UBE) of:

$$UBE = CP_0(n) \sum_k |a_{0,k} + \Delta a_{0,k}|. \quad (18)$$

It should be noted that UBE is generally defined as a measure for a statistically outlying situation for signal re-growth around the peak signal. Since $CP_0(n)$ is a known sequence, the following can be imposed to solve for $\Delta a_{0,k}$:

$$\min_{\Delta a_{0,k}} \left(\sum_k |a_{0,k} + \Delta a_{0,k}|\right)^2 + \varepsilon_{EVM} \sum_k |a_{0,k}|^2 \quad (19)$$

with the constraint that $$\left|\sum_k a_{0,k} + \Delta a_{0,k}\right| \le \frac{R}{CP_0(0)} \quad (20)$$

Accordingly, a statistically outlying situation for peak regrowth (as well as the peak itself) are accounted for when construct the cancellation pulse. Also, in order to maintain a small error vector magnitude (EVM), a small difference of $|a_{0,k}|CP_0(n)$ for each carrier is desirable, and if an EVM factor is further defined as:

$$EVM = \sum_k \left|\frac{\Delta a_{0,k}}{|a_{0,k}|}\right|^2 |CP_0(n)|^2, \quad (21)$$

then application of the technique of Lagrange optimization, bearing in mind equations (19) through (21), yields:

$$\Delta a_{0,k} = \frac{|a_{0,k}|^2}{\sum_m |a_{0,m}|^2} \left(\frac{R}{S(N_{peakloc})} - 1\right) \sum_m a_{0,m} = \beta_k \frac{pulseGain}{CP_0(0)}. \quad (22)$$

From this solution for $\Delta a_{0,k}$, cancellation pulse coefficients $\beta_k$ can take one of the four desired forms:

$$\beta_k = \frac{1}{K}; \text{ or} \quad (23)$$

$$\beta_k = \frac{|a_{0,k}|^2}{\sum_m |a_{0,m}|^2}; \text{ or} \quad (24)$$

$$\beta_k = \frac{|a_{0,k}|}{\sum_m |a_{0,m}|}; \text{ or} \quad (25)$$

$$\beta_k = \frac{\text{Re}(a_{0,k}^* S(N_{peakloc}))}{\sum_m \text{Re}(a_{0,m}^* S(N_{peakloc}))}. \quad (26)$$

In steps 312 and 314, a new base cancellation pulse $CP_{new,base}$ and new cancellation pulse $CP_{new}$ are calculated. Preferably, the new base cancellation pulse $CP_{new,base}$ is:

$$CP_{new,base}(n) = \sum_k \beta_k \frac{CP_k(n)}{CP_0(0)}. \quad (27)$$

Additionally, the new cancellation pulse is:

$$CP_{new}(n) = CP_{new,base}(n) * pulseGain = \quad (28)$$
$$\left(\frac{R}{|S(N_{peakloc})|} - 1\right) S(N_{peakloc}) \sum_k \beta_k \frac{CP_k(n)}{CP_0(0)}.$$

The new cancellation pulse $CP_{new}(n)$ can then be combined with the original signal to reduce or eliminate the peaks in step 316.

In order to increase the speed of processing, several "short cuts" can be implemented. First, instead of calculating and storing a new base cancellation pulse $CP_{new,base}$, a lookup table (storing multiple base cancellation pulses) can be used to choose a cancellation pulse that roughly matches conditions. Second, the peak envelope and phase information can be roughly matched to a pre-stored cancellation pulse, using the last several least significant bits (LSBs) of the data sample to record the contributions from each carrier.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
  an input section that receives an input signal and that generates an intermediate signal, wherein the input section includes:
    an interface that receives the input signal and that generates a wideband signal;
    a crest factor reduction (CFR) unit that reduces a peak-to-average ratio (PAR) of the wideband signal, wherein the CFR unit has a stage that includes:
      a peak detector that detects a peak from the wideband signal; and
      a cancellation pulse calculator that is coupled to the peak detector and that calculates a cancellation pulse having an envelop and phase information that are approximately the same as the peak, wherein the cancellation pulse calculator includes:
        a gain calculator that is coupled to the peak detector and that that calculates a gain from the magnitude of the peak and a threshold;
        a contribution calculator that is coupled to the peak detector and that approximates each carrier's contribution to the peak;
        a coefficient calculator that is coupled to the contribution calculator and that calculates a cancellation pulse coefficient for each carrier from its contribution to the peak;
        a first pulse calculator that is coupled to the coefficient calculator and that calculates a base cancellation pulse from the cancellation pulse coefficients for each carrier;
        a second pulse calculator that is coupled to the gain calculator and to the first pulse calculator and that calculate a cancellation pulse from the base cancellation pulse and the gaiff, and
        a peak canceller that is coupled to the peak detector and to the second pulse calculator and that applies the cancellation pulse to the wideband signal;
    output logic that receives a signal the wideband signal from the CFR unit having a reduced PAR and that generates the intermediate signal; and
  an output section that receives the intermediate signal and that generates a transmission signal.

2. The apparatus of claim 1, wherein the interface further comprises:
  interface logic that receives the input signal; and
  a digital upconverter (DUC) that receives an output from the interface logic and that generates the wideband signal.

3. The apparatus of claim 1, wherein the CFR unit further comprises a plurality of stages that each have the computer program produce embodied thereon.

4. The apparatus of claim 1, wherein the output section further comprises:
  an analog-to-digital converter (ADC) pipeline that receives a feedback signal; and
  a digital-to-analog converter (DAC) pipeline that generates the transmission signal from an output from the ADC pipeline and the intermediate signal.

5. The apparatus of claim 1, wherein the cancellation pulse calculator further comprises a lookup table that includes a plurality of prestored cancellation pulses.

6. A system for generating and transmitting a transmission signal, the system comprising:
  an input section that receives an input signal and that generates an intermediate signal, wherein the input section includes:
    an interface that receives the input signal and that generates a wideband signal;
    a crest factor reduction (CFR) unit that that reduces a peak-to-average ratio (PAR) of the wideband signal, wherein the CFR unit has a stage that includes:
      a peak detector that detects a peak from the wideband signal; and
      a cancellation pulse calculator that is coupled to the peak detector and that calculates a cancellation pulse having an envelop and phase information that are approximately the same as the peak, wherein the cancellation pulse calculator includes:
        a gain calculator that is coupled to the peak detector and that that calculates a gain from the magnitude of the peak and a threshold;
        a contribution calculator that is coupled to the peak detector and that approximates each carrier's contribution to the peak;
        a coefficient calculator that is coupled to the contribution calculator and that calculates a cancellation pulse coefficient for each carrier from its contribution to the peak;
        a first pulse calculator that is coupled to the coefficient calculator and that calculates a base cancellation pulse from the cancellation pulse coefficients for each carrier;
        a second pulse calculator that is coupled to the gain calculator and to the first pulse calculator and that calculate a cancellation pulse from the base cancellation pulse and the gain; and
        a peak canceller that is coupled to the peak detector and to the second pulse calculator and that applies the cancellation pulse to the wideband signal;
    output logic that receives a signal the wideband signal from the CFR unit having a reduced PAR and that generates the intermediate signal;
  an output section that receives the intermediate signal and that generates a digital transmission signal;
  transmission circuitry that receives the digital transmission signal and generates a radio frequency (RF) signal; and
  an antenna that outputs the RF signal.

7. The system of claim 6, wherein the interface further comprises:
  interface logic that receives the input signal; and a DUC that receives an output from the interface logic and that generates the wideband signal.

8. The system of claim 6, wherein the CFR unit further comprises a plurality of stages that each have the computer program produce embodied thereon.

9. The system of claim 6, wherein the output section further comprises:
- an analog-to-digital converter (ADC) pipeline that receives a feedback signal; and
- a digital-to-analog converter (DAC) pipeline that generates the transmission signal from an output from the ADC pipeline and the intermediate signal.

10. The system of claim 6, wherein the cancellation pulse calculator further comprises a lookup table that includes a plurality of prestored cancellation .pulses.

11. The system of claim 6, wherein the transmission circuitry further comprises:
- a digital-to-analog converter (DAC) that receives the digital transmission signal;
- a quadrature modulator that receives an output from the DAC and generates the RF signal;
- an amplifier that amplifies the RF signal; and
- an analog-to-digital converter (ADC) feedback pipelines that generates a feedback signal for the output section from the RF signal.

* * * * *